United States Patent
Feller et al.

(10) Patent No.: US 6,241,383 B1
(45) Date of Patent: Jun. 5, 2001

(54) HEAT EXCHANGER MAINTENANCE MONITOR APPARATUS AND METHOD

(76) Inventors: Murray F. Feller, Rte. 2, Box 562A, Micanopy, FL (US) 32667; John F. Garey, 65 Old Knoll Rd., Marion, MA (US) 02738

( * ) Notice: Subject to any disclaimer, the term of this patent is extended or adjusted under 35 U.S.C. 154(b) by 0 days.

(21) Appl. No.: 09/238,876

(22) Filed: Jan. 27, 1999

Related U.S. Application Data

(63) Continuation-in-part of application No. 09/047,665, filed on Mar. 25, 1998, now abandoned.

(51) Int. Cl.[7] .................................................. G01K 17/06
(52) U.S. Cl. ............................. 374/40; 374/29; 374/135
(58) Field of Search ................... 374/29, 30, 40, 374/41, 42, 43, 148, 164, 135

(56) References Cited

U.S. PATENT DOCUMENTS

| | | | |
|---|---|---|---|
| 3,777,561 | 12/1973 | Lewis | 73/181 |
| 3,802,262 | 4/1974 | Banks | 73/194 EM |
| 3,897,684 | 8/1975 | Dewan | 73/194 EM |
| 3,903,741 | 9/1975 | Greene | 73/181 |
| 3,967,500 | 7/1976 | Forster | 73/194 EM |
| 4,195,515 | 4/1980 | Smoll | 73/194 EM |
| 4,256,556 * | 3/1981 | Bennett et al. | 204/147 |
| 4,396,300 * | 8/1983 | Characklis et al. | 374/43 |
| 4,553,852 * | 11/1985 | Derderian et al. | 374/1 |
| 4,618,266 * | 10/1986 | Feller | 374/41 |
| 4,825,703 | 5/1989 | Kubota | 73/861.12 |
| 4,854,730 * | 8/1989 | Fradeu | 374/164 |
| 4,929,089 * | 5/1990 | Tsuchida | 374/44 |
| 4,944,035 * | 7/1990 | Aagardl Roger et al. | 364/556 |
| 5,059,032 * | 10/1991 | Mack et al. | 374/29 |
| 5,615,733 * | 4/1997 | Yang | 165/11.1 |
| 5,691,484 | 11/1997 | Feller | 73/861.13 |
| 5,848,094 * | 12/1998 | Buhl et al. | 374/31 |
| 5,902,043 * | 5/1999 | Price et al. | 374/39 |
| 5,940,784 * | 8/1999 | El-Husayni | 702/130 |
| 6,023,969 * | 2/2000 | Feller | 73/204.25 |
| 6,058,774 * | 5/2000 | Rengshausen | 73/204.24 |
| 6,086,251 * | 7/2000 | Stark | 374/179 |
| 6,106,149 * | 2/2000 | Smith | 374/31 |

FOREIGN PATENT DOCUMENTS

| | | | |
|---|---|---|---|
| 000681328 * | 2/1993 | (CH) | 374/29 |
| 1 231 447 | 12/1966 | (DE) . | |
| 1 648 143 | 3/1971 | (DE) . | |
| 30 00 965 A1 | 7/1981 | (DE) . | |
| 33 29 899 A1 | 3/1985 | (DE) . | |
| 37 00 165 A1 | 7/1988 | (DE) . | |
| 0 069 456 | 1/1983 | (EP) . | |
| 2-280012(A) | 2/1991 | (JP) . | |
| 683784 * | 6/1980 | (SU) | 374/29 |
| 1659789 * | 6/1991 | (SU) | 374/29 |

* cited by examiner

Primary Examiner—G. Bradley Bennett
Assistant Examiner—Gail Verbitsky
(74) Attorney, Agent, or Firm—David Kiewit

(57) ABSTRACT

A device for monitoring heat transfer systems. A non-heated temperature sensor is used to determine the approximate temperature of a flowing fluid being monitored. A heated temperature sensor is exposed to and is thereby cooled by the flowing fluid being monitored. A flow measurement is made using a flow sensor and the heat transfer from the heated temperature sensor to the flowing fluid is determined. An electrolytic means is provided for chemically altering the environment of the heat transfer surface of the heated temperature sensor to determine its use or effects for testing, operation and maintenance of the heat transfer system and also the device. A hot tap insertion flow probe configuration is presented which includes a cost effective miniature magnetic flow sensor using permanent magnets.

19 Claims, 3 Drawing Sheets

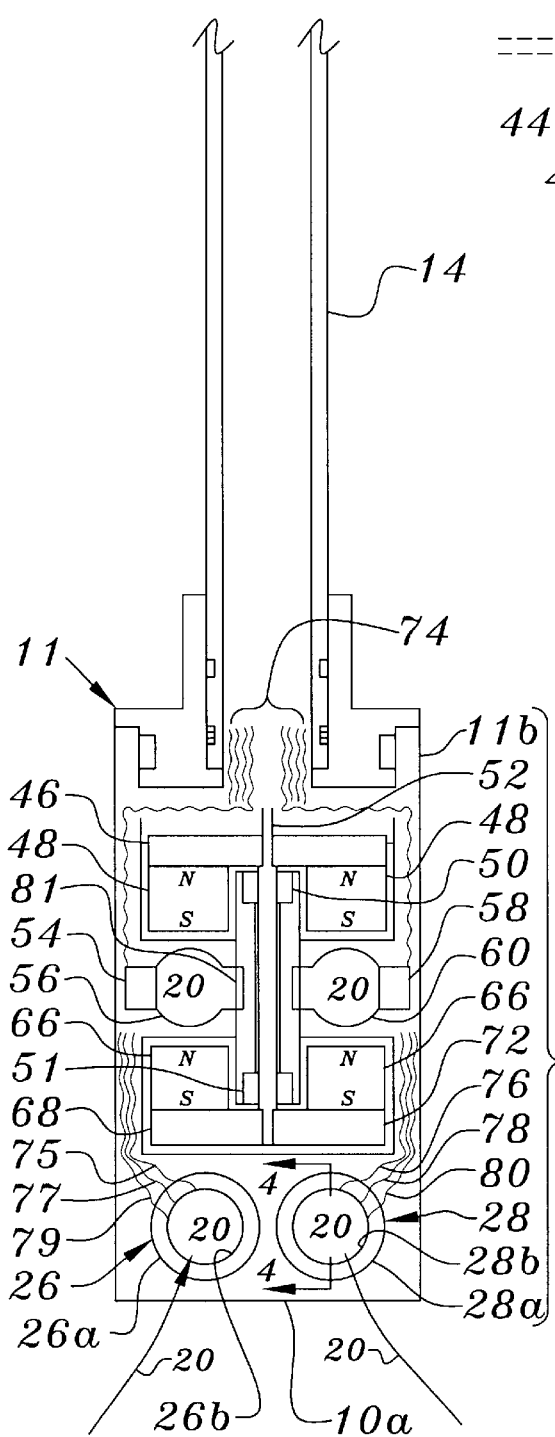
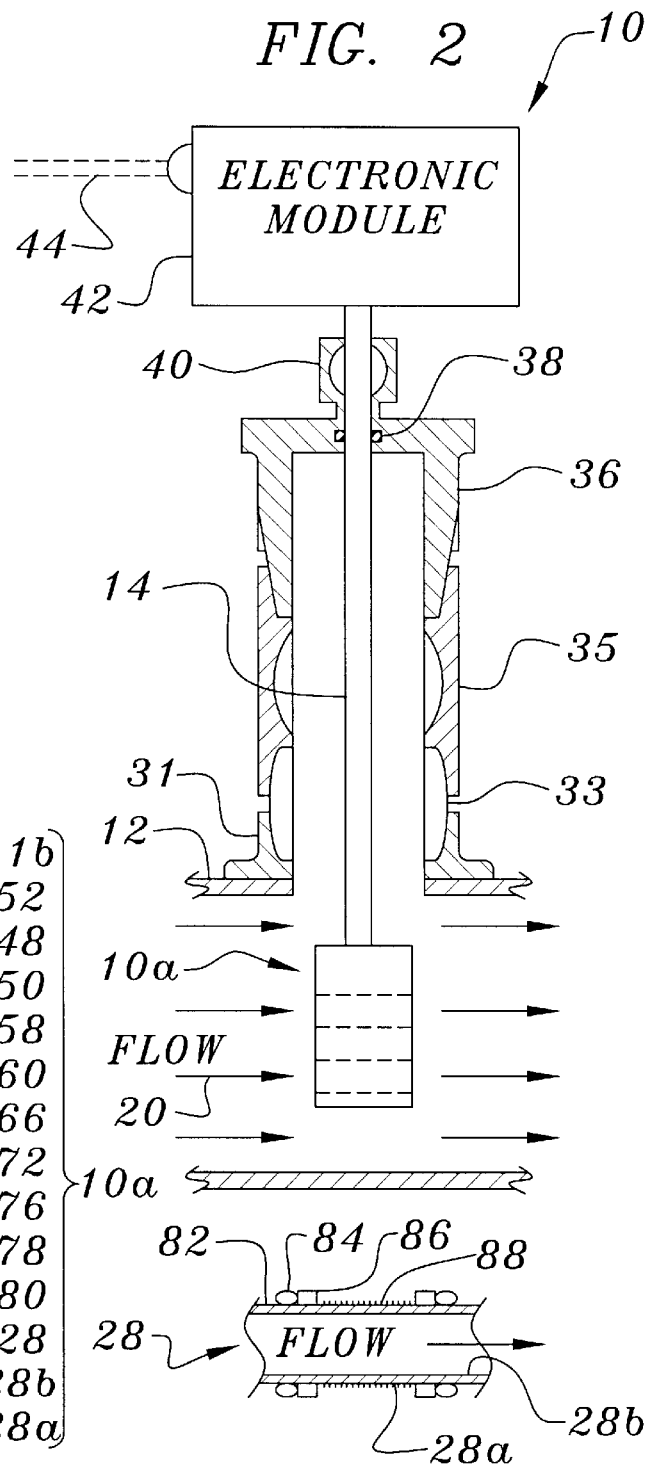

HEAT EXCHANGER MAINTENANCE MONITOR APPARATUS AND METHOD

CROSS REFERENCE TO RELATED APPLICATIONS

This is a continuation-in-part of U.S. patent application Ser. No. 09/047,665, filed Mar. 25, 1998, now abandoned.

BACKGROUND OF THE INVENTION

1. Technical Field

The present invention relates to a method for long term monitoring of heat exchangers in which the rate of flow of the heat exchange fluid and the temperature change that the fluid flow produces on a heated surface exposed to the fluid flow is measured, and further to a means for electrolytically altering the fluid environment of the heated surface.

2. Discussion

This invention arises from the need to measure the performance degradation, caused by surface fouling, of heat transfer surfaces in heat exchangers used in various applications such as power generation heat exchanger applications which may result from fouling of those surfaces. Water is often used as the active heat exchange fluid and if used untreated or inadequately treated, can promote both scale formation and micro-bio-fouling which can drastically reduce heat transfer efficiency. It is often impractical to adequately treat such water because of the large quantities used. Instead, the heat exchanger active surfaces must often be cleaned periodically as needed. In some heat exchanger operations cleaning is performed continuously. For example, in some applications cleaning is performed with circulating abrasive coated balls. In other operations, the exchangers are temporarily removed from service, opened and cleaned directly.

Both of the above methods have their related costs and mix of advantages and disadvantages which, in either case, leaves much improvement to be desired. For example, the procedure using the abrasive balls may not perform the cleaning thoroughly enough while the direct cleaning method incurs the expense of down time and high labor costs. By determining the effectiveness of the cleaning operation and when cleaning is needed, a heat exchanger can be more optimally maintained and its overall cost of operation reduced.

In some applications, for example, aboard ocean going ships, chemical treatment of the ocean water used as the heat exchange fluid is one of the ways, at least in part, of maintaining the heat exchange surfaces at high efficiency. Chlorination of the ocean water to control bio-fouling of the heat exchanger surfaces is commonly employed. However, careful control of the chlorination is required to achieve the desired maintenance without corrosively damaging the related plumbing or producing undesirable environmental impacts.

Previously developed devices and/or methods have typically determined the degradation of the heat transfer efficiency of heat exchangers from long term measurements of the exchanger's inlet and outlet temperatures, and its flow. Refinements in this art include taking multiple flow and temperature measurements directly at the internal sites of the heat exchanger, as in U.S. Pat. No. 5,429,178. While this means can be effective, it is somewhat expensive. Furthermore, if the flow sensor is of the paddle wheel type for example, the precision of measurement, particularly at low flow rates, is poor and the moving vaned paddle wheel element is itself subject to accumulations and blockage which can result in poor reliability.

Ideally, a device which is used to monitor the condition of a heat exchanger would, in addition to being cost effective to purchase, install and maintain, simulate the heat exchanger in miniature and be subject to the same operating environment. The instrument would experience the same heat exchange fluid at similar heat exchange temperatures and would use the same material heat transfer surfaces. Then, by measuring the heat transfer of the heat exchange surface within the device, the heat transfer characteristic of the heat exchanger can be reasonably inferred and maintenance procedures more optimally performed. As a further provision, the monitoring device would preferably include a means for exposing some of its active surfaces to controlled chemical exposure, for example, chlorination.

SUMMARY OF THE INVENTION

The above and other objects are provided by a heat transfer monitoring apparatus and method in accordance with the preferred embodiments of the present invention. The apparatus provides for the flow rate measurement of the heat exchange fluid and the measurement of the temperature rise experienced by a heated temperature responsive sensing element exposed to that flowing fluid. The temperature rise of the sensing element is affected by the efficiency of its heat transfer surface to that fluid and to the flow rate of the fluid.

In a preferred embodiment a magnetic flow sensor configured as an insertion flow probe senses the fluid flow rate. Mounted below it, two tubes, each wound with temperature responsive wire, comprise the heated temperature responsive sensing elements. Electrical current flowing through the wires causes the temperature of each flow tube to rise. Fluid flow through the flow tubes removes heat from the flow tubes, thereby reducing the temperature rise of each. Since clean flow tubes will transfer their heat energy to the fluid with higher efficiency for the same flow rate, the sensing elements will experience a relatively small temperature rise compared to that which would be experienced if the flow tubes contained a thermally insulating coating on their heat exchange surfaces. By measuring the flow rate, electrical power to and the temperature rise of the sensing elements over that of the fluid, and the flow tube dimensions, a heat transfer constant factor may be determined. Alternatively, as the change in heat transfer over a period of heat exchanger operation is typically the primary requirement for maintenance, only a relative indication of heat transfer is often needed. As a result, the flow tube dimensions, as long as they remain reasonably constant, need not be of concern.

Many types of flow sensors may be used for making the fluid flow measurement although the magnetic type is preferred. The magnetic type has the ability to operate reliably in difficult conditions over a wide range of flow rates and has no moving parts in the flow passage. Since long term repeatability rather than absolute accuracy is the principal requirement of the flow sensing component of the monitor, a relatively inexpensive and small insertion probe configured flow sensor is usually satisfactory. However, until recently all known commercially available magnetic flow meters, whether of full port or probe style, were relatively expensive, large and somewhat complex, often requiring fine tuning during installation to achieve acceptable results. This has now changed with the introduction of a new magnetic flow sensing technology described in a U.S. Pat. No. 5,691,484, issued Nov. 25, 1997, the disclosure of which is hereby incorporated by reference. This technology enables a small and relatively inexpensive insertion flow probe to be made which uses permanent magnets and simplified electronics to generate flow related signals with a favorable balance of sensitivity, long term stability and reliability, which makes it the sensor type of choice for the present invention.

In operation, the flow monitor's magnets are physically relocated periodically so as to reverse the polarity of the magnetic flux through the fluid flow passages. This causes the generated voltage at the electrodes to be an alternating voltage with a magnitude proportional to the fluid flow rate. The magnets are relocated in such a way that the common mode signals generated by their movement cancel leaving only the signal responsive to the fluid flow. Furthermore, the mechanical effort to move the magnets is very small since the magnetic flux pattern is stable and the magnetic fields are not exposed to variable magnetic reluctance in the magnetic circuit. The total power consumption for the magnetic flow sensor of the present invention is in the tens of milliwatts compared to tens of watts for other conventional types of magnets flow sensing devices.

Although a single heated temperature responsive sensing element is able to provide a useful heat transfer measurement by having it "time share" the fluid temperature measurement and temperature rise functions, two such sensing elements enable a more flexible flow sensing monitor to be produced. For example, one element may be heated to approximate the normal heat exchanger-to-fluid temperature differential while the other element is heated a different amount, heat cycled differently or not heated at all. In this manner, the effects of a variety of heat transfer exposures can be observed and/or control over such effects established to aid in heat exchanger operation and maintenance. The power dissipated by each sensing element is controlled to represent the conditions desired to be established which would typically be those experienced or being considered for the heat exchanger. Furthermore, the sensing elements, typically having their resistance change with temperature, are also used to sense temperature. When energized with narrow pulses, for example, to maintain their average power dissipation very low, their resistances reflect the temperature of the heat transfer fluid; when energized with relatively wide pulses or constant DC current, for example, to have relatively high average power dissipation, their resistances reflect the temperature rise of the sensing element above that of the fluid. The flow and temperature signals from the flow sensor are electronically processed as required for the computation of heat transfer, for display and recording, and for use in automatically controlling means to maintain the related heat transfer system.

In an alternative preferred embodiment at least one of the flow tubes of a pair of sensing elements is connected to an electric power source so that an electric current path is established from that flow tube through the heat exchange fluid to a return electrode. The return electrode may be a part of the flow monitoring device or piping of the heat exchange system that it is being used with. Electrolysis will occur which provides an additional controllable factor for monitoring reactions in the heat exchange environment and testing maintenance performance. For example, when connecting the flow tube of a sensing element to a positive potential with respect to the pipe containing ocean water as the heat transfer fluid, the flow tube will liberate chlorine gas at its surface, thereby tending to remove bio-fouling coatings and serving as a reference for similar maintenance of the heat exchanger system.

In another preferred embodiment a magnetic flow sensor employs a multipole electromagnet and senses flow through a single flow passage centered with the axis of the probe. The flow passage is configured to both detect the flow rate of the heat exchange fluid through it and the heat transfer from a heated surface portion of the flow passage to that fluid.

In yet another preferred embodiment, flow rate of the heat exchanger fluid through a flow passage is determined by measuring the rate of heat transfer from a heated portion of the flow passage to the fluid whereby the flow passage heat transfer surface is maintained clean so as not to degrade heat transfer to the fluid.

BRIEF DESCRIPTION OF THE DRAWINGS

The various advantages of the present invention will become apparent to one skilled in the art by reading the following specification and subjoined claims and by referencing the following drawings in which:

FIG. 2 is a simplified side view of the monitor arranged as an insertion probe in accordance with a preferred embodiment of the present invention;

FIG. 3 is a front view in cross section of the fluid sensing portion of the monitor in accordance with a preferred embodiment of the present invention;

FIG. 4 is a side cross sectional view of one of the sensing elements, as take along section line 4—4 in FIG. 3;

DETAILED DESCRIPTION OF THE PREFERRED EMBODIMENTS

Figure 1:
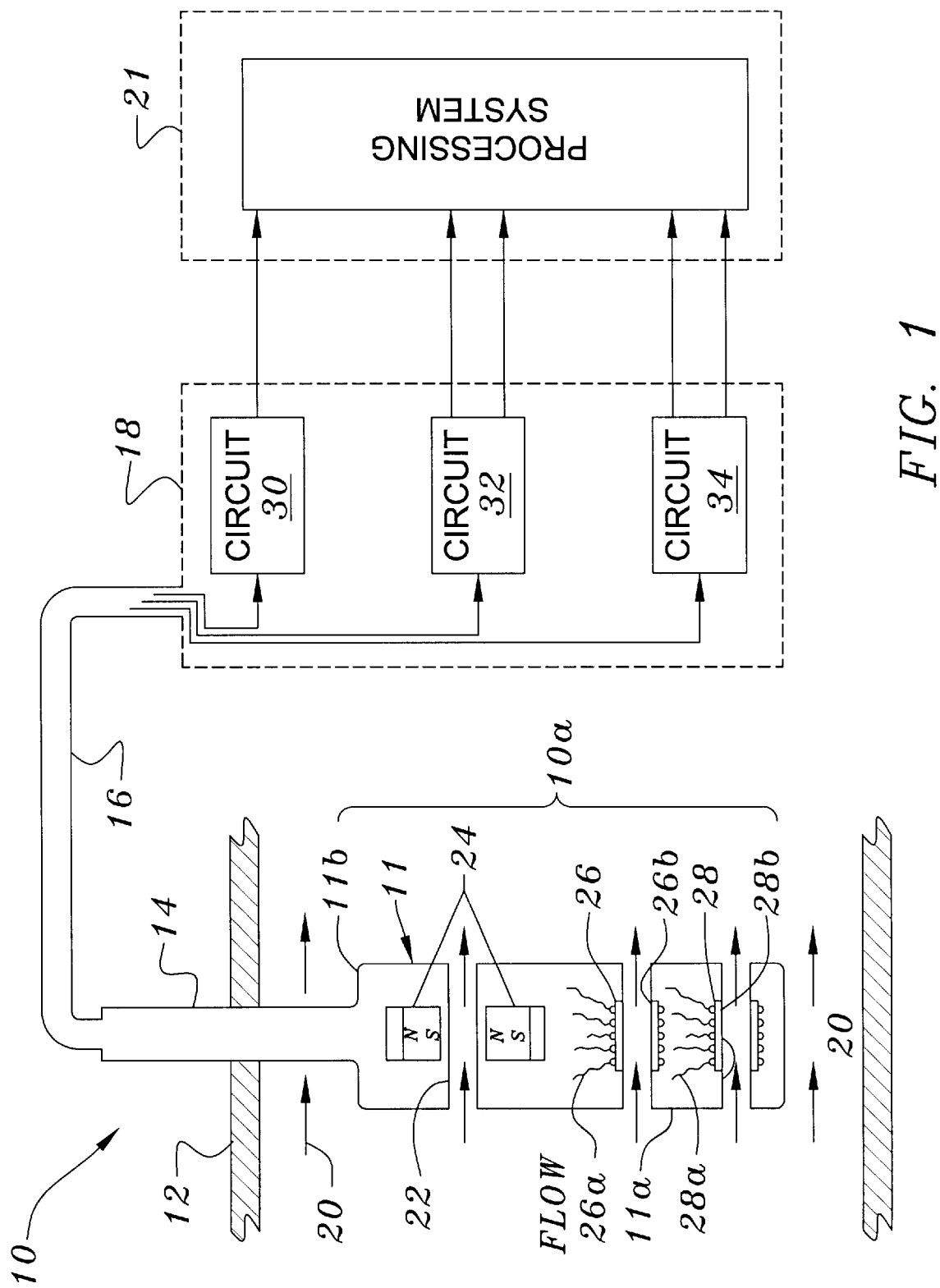
FIG. 1 is an overall block diagram of a flow monitor in accordance with a preferred embodiment of the present invention.

Referring to FIG. 1, a monitor 10 in accordance with a preferred embodiment of the present invention is shown. A probe body 11 provides mechanical support and protection for a first heated, temperature responsive sensing element 26 and a second heated, temperature responsive sensing element 28. Both sensing elements 26 and 28 are located at a bottom portion 10a of the body 11. One of two flow passages 22 of a magnetic flow sensor has magnets 24 in an upper section 11b of the body 11 disposed on opposite sides of the flow passage 22. The sensing elements 26 and 28 may alternatively be located on top of the flow sensor flow passage 22 or displaced horizontally. The probe body 11, magnets 24, and sensing elements 26 and 28 can be viewed as the principal sensing components of a sensing assembly, and are designated as such by reference numeral 10a.

The sensing assembly 10a is mounted via a connecting stem 14 within a pipe or conduit 12 containing a flowing heat exchanger fluid 20 being monitored. Fluid 20 impinges sensing elements 26 and 28 and flow passage 22, which are connected through wiring 16 to a supporting electronics sub system 18. Circuit 30 supports flow sensor 22, a circuit 32 supports sensing element 26, and a circuit 34 supports sensing element 28. A processing system 21 provides the computational and data storage functions for the signals produced by sub system 18.

Sensing elements 26 and 28 preferably each comprise thermally conductive, thin wall tubing sections 26b and 28b, respectively, of a type suitable for resisting the fluid environment that they will be exposed to. Electrically insulated wires 26a, 28a, each having an electrical resistance which changes significantly with temperature, are wound over the tubing sections 26b and 28b, respectively. Examples of suitable tubing materials are stainless steel and titanium. Examples of suitable wire are platinum and nickel. The winding is performed to maximize the thermal coupling between each tubing section 26b, 28b and its respective wire 26a, 28a so that the flow passage temperature of each tube closely approximates that of its associated wire 26a or 28a. This is so even though the wires 26a, 28a may be dissipating substantial electrical power and the tubing sections 26b, 28b may be transferring the heat energy very efficiently to the heat exchange fluid. A sensing element may alternatively be constructed where the heating and temperature sensing functions are provided by separate components. It will be appreciated that only a single temperature sensitive element could be employed provided the element is alternatively used in a time-shared fashion to determine the temperature of the flowing fluid and the temperature rise of the element itself.

In a typical mode of operation, sensing element 26 is energized at a constant power level so that the temperature rise of its heat transfer surface to the fluid 20 approximates that experienced by the system heat exchanger which it is monitoring. The efficiency of the heat transfer surface degrades over a period of time due to the accumulation of thermally insulating coatings such that the temperature rise of sensing element 26 over fluid 20 increases correspondingly. This temperature rise provides a measure of the heat transfer degradation. Sensing element 28 senses the temperature of the fluid 20 so that the difference temperature between sensing elements 26 and 28 can be determined. Flow sensor 22 provides a measure of the fluid flow rate so that the computation of heat transfer efficiency can be suitably adjusted for this variable. The resultant signal from the processing system 21 is representative of heat transfer and is displayed and recorded, and may further be used to automatically engage system maintenance functions and to enable alarms as may be desired.

Sensing element 26 has a winding resistance which is typically used as an arm in a form of bridge circuit in circuit 32 to derive a temperature measurement therefrom. The opposing arm would typically have a much smaller resistance so that most of the bridge power would be dissipated by sensing element 26. The bridge containing sensing element 26 may be energized with a continuous supply, for example DC at a constant voltage, whereby the voltage may be selected to accommodate a variety of heat transfer conditions. Alternatively, the supply voltage can be maintained constant but it is applied in pulses to the bridge so that a selection of the duty cycle of the applied pulses provides the means to accommodate a variety of conditions.

Sensing element 28 is also typically used as an arm in a form of bridge circuit in circuit 34 to derive a temperature measurement therefrom. It is convenient to energize the bridge circuit with a power supply voltage maintained constant which is applied in narrow pulses to the bridge. This keeps the power dissipation of sensing element 28 very low, thereby enabling it to sense the temperature of the fluid 20 accurately.

It is further convenient to make both sensing elements 26 and 28 the same and to also energize their bridge circuits with wide range duty cycle controlled pulses such that either may be used for the temperature rise or fluid temperature sensing functions. A single such sensing element may, of course, perform both functions at different times.

The fluid flow responsive signals from the flow sensor are processed in circuit 30 where they are amplified, filtered and detected to produce a DC voltage with a magnitude proportional to flow rate. The flow responsive signals are AC signals with a frequency rate corresponding to the magnetic flux polarity reversal rate due to the relocation of the permanent magnets 24. While this frequency may be selected over a wide range, a few hertz is optimum to enable very high rejection of interfering signals at the power line and sensing element 26 and 28 bridge supply frequencies to be obtained.

In an alternative preferred embodiment of the present invention, one or both of the sensing elements 26 and 28 additionally have electrical connections made to their tubing sections 26b, 28b so that an electrical current can pass between their flow passages and the heat exchange fluid 20, and complete the path through the stem 14, pipe 12 or other applicable component. The electrolysis activity so produced is energized from the blocks 32 and 34, respectively, to produce the desired level and polarity. The power supplies for this function may provide either smooth or pulsed DC and are selected accordingly. The electrolysis promotes the generation of gasses which may be significant to the testing, operation or maintenance of the heat exchanger system and also of the monitoring device 10. The products of the electrolysis depend upon the constituents of the tubing sections 26b and 28b and the heat exchange fluid, and will vary with each installation, thereby making flexibility of the monitor operation a desirable quality.

FIG. 2 illustrates a practical application of the monitor 10 configured as an insertion flow probe. The monitor 10 is attached to stem 14 upon which is mounted an electronics module 42 from which a power and signal cable 44 emerges. Pipe 12 contains the heat exchange fluid 20 and is in communication with a branch fitting 30 to which it is typically welded. A threaded close nipple 32 joins a ball valve 34 to a hot tap fitting 36 which contains an o-ring seal 38 and a compression seal 40.

The insertion probe of FIG. 2 represents a particularly convenient and cost effective way of configuring and mounting the monitor 10. The monitor stem 14 passes through the o-ring seal 38 so that the principal sensing components 10a may be moved to the desired position while the pipe 12 is pressurized with the heat exchange fluid 20 without any of the fluid escaping. Tightening of the compression seal prevents further stem 14 movement. It is further noted that the principal sensing components 10a, by fitting into the underside of the hot tap fitting 36, are clear of the ball valve 34. Thus, when the ball valve 34 is closed, the entire monitor 10 with the hot tap fitting 36 may be either removed or installed. This arrangement enables the monitor 10 to be easily installed and removed without the need for stopping normal operation of the heat exchanger system.

FIG. 3 illustrates additional details of the principal sensing components 10a of the monitor 10. Stem 14 joins housing 11 which provides the containment, support and protection for the principal sensing components 10a. Sensing elements 26 and 28 are located at the bottom 11a of the body and exposed to flow 20. Connecting wires 75, 77 are coupled to temperature responsive winding 26a and wire 79 is coupled to a flow passage 26b. Connecting wires 76, 78 are coupled to temperature responsive winding 28a and wire 80 is coupled to flow passage 28b. All of the wires 75, 77, 79, 76, 78 and 80 are routed up into area 74 inside of the stem 14 to their respective electronics. The sensing elements 26 and 28 are thermally insulated in their mountings so that their principal heat loss is directly through their flow passages 26b and 28b, respectively, to the heat exchange fluid 20.

The flow sensor also has two flow passages 56 and 60 through which the fluid flow 20 passes. On top of the passages 56 and 60 is a magnetic disc 46 with attached magnets 48 of the polarity shown. Not shown are two similar magnets also mounted on disc 46 inbetween those shown but with the opposite polarity. The disc 46 is attached to a shaft 52 which also supports at its other end a similar disc 68, magnets 66 and intermediately spaced similar magnets with reversed polarity as previously described. A set of ball bearing races 50 and 51 support the weight of the discs 46 and 68 with the eight attached magnets 48 and 66. This permits their rotation with a motor (not shown) relative to flow passages 56 and 60 while the magnetic attractive forces between the discs 46 and 68 are supported by shoulders on the shaft 52.

In operation, an intense magnetic field of the same polarity penetrates the flow passages 56 and 60. In the presence of the flowing fluid 20, this causes a corresponding electrical signal to be generated in the fluid 20 at the location of electrodes 54 and 58 and at a common electrode 74, which makes the electrical connection between the flow passages 56 and 60.

Motor rotation is typically performed by unidirectional stepper or linear motors of the brushless variety and by bi-directional stepper and oscillatory types. The motor is preferably located in an electronics module 42 shown in FIG. 2. Alternatively, it may be disposed in the volume area occupied by the principal sensing components 10a either as a separately identifiable component or by using flux from the magnets 48 and 66 which are not being used at the time for generating flow relating signals, together with added electromagnets between flow passages 56 and 60 to provide the rotational torque. Generally low speed and light loading of the bearings suggest very long operational lifetimes.

FIG. 4 illustrates additional detail of the sensing element 28. It will be appreciated that sensing element 26 is identical in construction to element 28. Flow passage 28b provides the passage for the heat exchange fluid 20. Its exterior is sealed at each end to the housing 11 in FIG. 3 such as by an o-ring 84 and backing disc 86. Wrapped around flow passage 28b is the coil of thermally responsive wire 28a. This configuration of the sensing elements provides a very practical combination of ruggedness, sensitivity, speed of response and power dissipation.

Figures 5, 6:
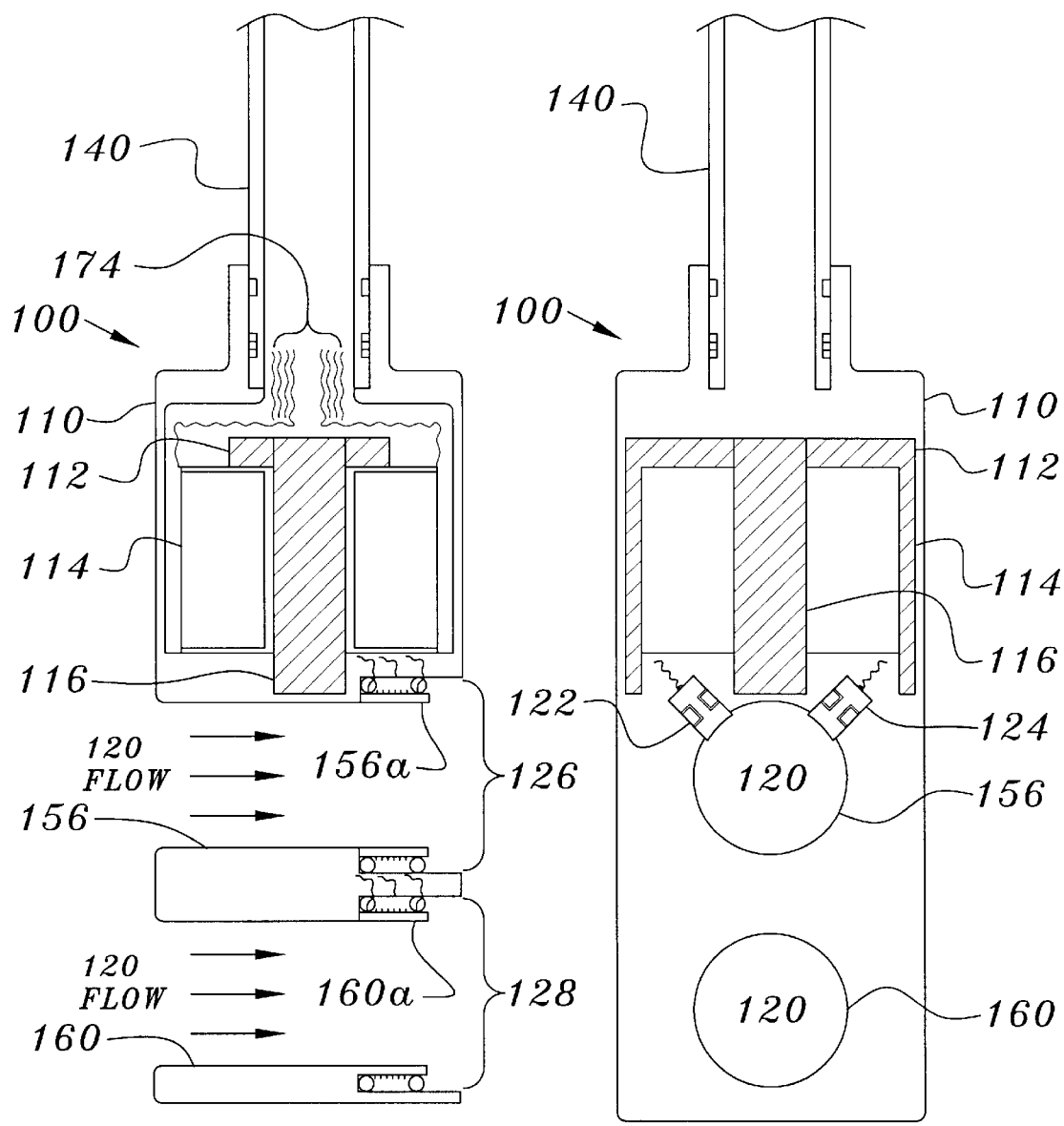
FIG. 5 is a simplified side cross sectional view of a monitor in accordance with an alternative preferred embodiment of the present invention.
FIG. 6 is a partial cross sectional end view cross section of the monitor of FIG. 5 taken in accordance with directional arrow 6 in FIG. 5.

Referring to FIGS. 5 and 6, a monitor 100 in accordance with an alternative preferred embodiment of the present invention is shown. Components similar to those in monitor 10 are designated by reference numerals increased by 100. A body 110 provides mechanical support and protection for the monitor 100 components and also includes two parallel flow passages 156 and 160, one above the other, which extend completely through the body 110. A magnetic core 116, a magnetic core extension 112 and a coil 114 comprise an electromagnet of a magnetic flow meter which detects the flow 120 through the flow passage 156. With specific reference to FIG. 6, the monitor 100 can be seen to include the core extension 112 to convey opposing polarity magnetic flux through flow passage 156, and the flow sensing electrodes 122 and 124. A first heated temperature responsive sensing element 126 is also wrapped around an end portion 156a of the flow passage 156 while a second temperature responsive sensing element 128 responsive to the fluid flow circumscribes an end portion 160a of a lower flow passage 160. Wiring 174 from all of the monitor 100 components is routed through stem 140 to supporting electronics, such as electronics 18 and 21 shown in FIG. 1.

An alternating magnetic flux is produced with opposing polarities at the ends of the magnetic core 116 and 112 so that the resultant magnetic flux is orthogonal through the fluid in flow passage 160. The magnetic flux causes a voltage to be generated in the fluid, where the magnitude of the voltage is proportional to its flow rate through the flow passage 160. The electrodes 122 and 124 are located to contact the fluid flow 120 and sense the voltage, which is then processed with the supporting electronics to provide the desired electrical signal for further processing and/or display as desired. The magnetic flow sensor uses a high efficiency multiple pole magnetic circuit as described in a U.S. Pat. No. 5,691,484, issued Nov. 25, 1997, and which is incorporated herein by reference. Using this flow sensing arrangement, the components in the immediate vicinity of the flow passage 160 can be made quite small while still enabling a relatively large flow generated signal to be produced. Other types of flow sensing systems, for example, magnetic systems using rotating permanent magnets, ultrasonic and turbine based systems can also be used. It will be noted that an ultrasonic based system may also help in maintaining the sensor heat exchange surfaces clean.

The heated temperature responsive elements 126 and 128 and their operation are essentially the same as elements 26 and 28 of FIGS. 1, 3 and 4. In a typical mode of operation each of the elements 126 and 128 is powered at a constant level whereby their temperatures change as a function of both flow rate and the efficiency of heat transfer between their heat exchange surfaces and the fluid flow 120. The supporting electronics detect and use the flow rate signal to cancel the effect of flow rate on the heat transfer of the elements 126 and 128 so that their temperature rise is directly related to their heat transfer to the fluid flow 120. Sensor 128 can be powered at a different level for comparison testing or serve as a clean reference sensor. The sensor 128 may be maintained clean, for example, by electrolysis. A positive potential on the heat exchanger surface of sensor 128 will, in the presence of salt water, cause chlorine gas to be liberated that will prevent biogrowths from forming on that surface and degrading its heat transfer ability. The sensor 128 will then serve as a pristine clean surface for heat transfer comparison with that of sensor 126, which has a different experience, typically that of the heat exchanger system being monitored. By operating the monitor 100 with flow rate and heat transfer exposure similar to that of the heat exchanger system being monitored, degradation due to scale and biogrowth accumulation for both the monitor 100 and system will proceed at about the same rate, thereby enabling the monitor 100 to reasonably predict the condition of that system. Either sensor 126 or 128 may be used in a time shared mode to measure the temperature of the fluid flow 120.

A variety of configurations and operating modes are possible using one or more of the sensors contained in monitor 100. In the simplest configuration, for example, heated sensor 126 alone may be used at different times for all of the needed functions. A measure of the heat transfer of sensor 126 to the fluid 120 is determined by its temperature rise above that of the fluid 120, when its heat exchange surface is clean, and when the heat exchanger system being monitored is also clean. As the heat transfer efficiency of both the sensor 120 and the heat exchanger system decline comparably due to surface accumulations which inhibit their heat transfer, they will experience a further rise in temperature above that of fluid 120. When such a temperature rise is great enough, this will indicate the need for maintenance procedures to be enacted which will restore the initial clean conditions to both. Sensor 126 can measure the fluid 120 temperature by the sensor being operated at very low average power levels in order to make any fluid 120 temperature rise negligible. Since the temperature rise of sensor 126 above that of the fluid 120 is affected by both the rate of flow of fluid 120 and the change in its heat transfer to fluid 120, this configuration is best suited for applications where the flow rate is constant.

Sensor 128, when maintained clean and operated at a constant power level, may be used to measure fluid flow rate as its temperature rise above fluid 120 varies in a predictable manner with flow rate. This flow rate measurement mode may be further enhanced to be directly responsive to mass flow rate by powering sensor 128 so that its temperature rise above fluid 120 is maintained constant irrespective of the fluid 120 flow rate. Sensor 128 may be maintained clean by several means such as by the generation of chlorine or other gasses or chemicals by electrolysis at or near its heat exchange surface, or by subjecting those surfaces to ultrasonic energy. When sensor 128 is maintained clean to enable it to be continually used for flow measurement and sensor 126 is used for the heat transfer and fluid temperature measurement functions, monitor 100 can operate over a wide flow range without requiring other flow rate sensing.

Sensor 126 and sensor 128 may be also located along the same opening 156, for example, whereby the fluid flow 120 contacts sensor 126 first so that it is not affected by either a change in fluid temperature or a surface cleaning activity applicable only to sensor 128. If necessary, sensor 126 may periodically be deenergized to permit sensor 128 to make a flow measurement without any possibility of degradation in measurement precision due to sensor 126 heating the fluid flow 120.

The monitor 100 overall configuration enables relatively large flow openings 156 and 160 to be utilized for a given monitor body 110 diameter particularly, and overall size generally, to minimize the flow obstruction that it represents and reduce calibration offsets when placed in relatively small flow lines. The centrally located flow openings 156 and 160 facilitate the rotation of the monitor 100 as a means of flow control so that the linear fluid flow 120 rate can match that through the heat exchanger system being monitored. Furthermore, one or more of the sensing components may be permanently mounted in a flow passage rather than in a probe.

Those skilled in the art can now appreciate from the foregoing description that the broad teachings of the present invention can be implemented in a variety of forms including heat transfer monitoring where the formerly exposed heated surface of a sensing element is instead cooled, for example, with a thermoelectric module. Therefore, while this invention has been described in connection with particular examples thereof, the true scope of the invention should not be so limited since other modifications will become apparent to the skilled practitioner upon a study of the drawings, specifications and claims.

What is claimed is:

1. A monitoring apparatus for measuring heat transfer between a selected one of two heat transfer surfaces at a first temperature and a flowing fluid at a second temperature which is different from the first temperature, the flowing fluid in contact with said heat transfer surfaces, said monitoring apparatus comprising:

a flow sensor for measuring a flow rate of said flowing fluid;

a source of electric power;

two sensing elements in contact with said flowing fluid, each of the two sensing elements comprising a respective one of the two heat transfer surfaces in contact with said flowing fluid, each of the sensing elements further comprising a respective electric heater, each of the two sensing elements adapted to selectively sense a respective heat exchange function between the respective heat transfer surface and said flowing fluid when the respective electric heater is connected to the source of electric power, each of the two sensing elements adapted to sense the second temperature when the respective heater is not connected to the source of electric power;

an electrical connection to at least one of the two sensing elements, the electrical connection adapted to pass an electric current through said flowing fluid to cause electrolysis; and a system responsive to said flow sensor and said two sensing elements for determining the amount of heat transferred from said selected surface to said flowing fluid.

2. The apparatus of claim 1 wherein each of said sensing elements comprises an electrically heated, temperature responsive sensing element.

3. The apparatus of claim 2 wherein at least one of said two sensing elements comprises a thermally conductive portion of tubing and a wire wound around at least a portion of said tubing.

4. The apparatus of claim 1, wherein said at least one of two sensing elements comprises a thermally conductive portion of tubing and a wire wound around at least a portion of said tubing.

5. The apparatus of claim 3, wherein said flowing fluid flows through said tubing and impinges said tubing.

6. The apparatus of claim 1, further comprising respective electrical connections to each of the two sensing elements, each electric connection adapted to pass a respective electrical current through said flowing fluid to cause electrolysis.

7. The apparatus of claim 1, wherein the at least one of said two sensing elements comprises an electrically conductive portion of tubing which said flowing fluid impinges; and wherein the electrical connection is made to the electrically conducting portion of tubing.

8. A monitoring apparatus for measuring heat transfer between a sensing surface in contact with a flowing fluid, where said flowing fluid is at a first temperature which is different than a second temperature of said sensing surface, said apparatus comprising:

a flow sensor for measuring a flow rate of said flowing fluid;

a source of electric power;

a sensing element comprising said sensing surface and an electric heater; said sensing element adapted to periodically sense the first temperature of said flowing fluid when the electric heater is not connected to the source of electric power, the sensing element further adapted to periodically sense a change in temperature as a result of heat transfer with said flowing fluid when the electric heater is connected to the source of electric power; and a system responsive to said flow sensor and said sensing element for determining a degree of heat transfer from said sensing surface to said flowing fluid.

9. The apparatus of claim 8, wherein said sensing surface comprises an electrically conductive sensing surface and an electrical connection thereto, whereby an electrical current applied to said sensing surface causes electrolysis.

10. The monitoring apparatus of claim 8, wherein said sensing element comprises: a thermally responsive flow passage for receiving said flowing fluid; and wherein the electric heater comprises a wire wound at least partially around said flow passage so as to heat said flow passage.

11. The apparatus of claim 8, wherein said sensing surface comprises an electrically conductive flow passage, the apparatus further comprising an electrical connection to the sensing surface whereby an electrical current applied to said flow passage is transmitted through said flowing fluid to induce electrolysis.

12. The apparatus of claim 8, further comprising a housing for supporting said flow sensor and said sensing element within a main flow conduit, wherein said flowing fluid flows through said main flow conduit.

13. A monitoring apparatus for measuring heat transfer between a heated surface and a flowing fluid in contact with said surface, said monitoring apparatus comprising:
- a sensor for measuring the flow rate of said flowing fluid;
- a single electrically heated sensing element in contact with said flowing fluid for selectively measuring a first temperature of said flowing fluid and for measuring a temperature rise of said sensing element over said flowing fluid; and
- a system responsive to said sensing element for determining the heat transfer efficiency from said sensing element to said fluid.

14. A monitoring apparatus for measuring heat transfer between a heated surface and a flowing fluid in contact with said surface, said monitoring apparatus comprising:
- at least one electrically heated sensing element in contact with said flowing fluid for selectively measuring a temperature of said flowing fluid and for selectively measuring a temperature rise of said sensing element over the temperature of said flowing fluid;
- means for powering the sensing element so that the measured temperature rise is maintained constant; and
- a system responsive to said sensing element for determining the heat transfer from said sensing element to said fluid.

15. The monitoring apparatus of claim 14, wherein the measuring of said flow rate of said flowing fluid by said heated sensing element is accomplished by monitoring the amount of electrical power required to maintain a desired temperature differential between said sensing element and said flowing fluid.

16. The apparatus of claim 14, wherein said at least one sensing element is adapted to be operated at different times to perform at least two of the functions of measuring a flow rate of said flowing fluid, measuring a temperature of said flowing fluid and measuring a temperature rise of said sensing element over said flowing fluid.

17. The monitoring apparatus of claim 14 further comprising an electrical connection adapted to apply an electric current to a surface of said sensing element in contact with said flowing fluid, so as to cause electrolysis.

18. The monitoring apparatus of claim 13, further comprising an electrical connection adapted to apply an electric current to a surface of said sensing element in contact with said flowing fluid, so as to cause electrolysis.

19. A monitoring apparatus for measuring a flow rate of a flowing fluid in contact with a heat transfer surface, said monitoring apparatus comprising:
- at least one electrically heated sensing element comprising the heat transfer surface, the at least one sensing element incorporating electrolysis to prevent fouling of the heat transfer surface, the at least one sensing element adapted to measure a temperature rise of said element over a temperature of said flowing fluid, the at least one electrically heated sensing element adapted to perform at least two of a fluid temperature sensing, fluid heat transfer sensing and fluid flow rate sensing functions in a time shared mode.

* * * * *